United States Patent [19]

Vetter et al.

[11] 4,145,078

[45] Mar. 20, 1979

[54] LOADING AND UNLOADING STATION FOR CONVEYORS WITH OVERHEAD TROLLEY DRIVES

[75] Inventors: Klaus Vetter; Rudolf Heber, both of Rastatt, Fed. Rep. of Germany

[73] Assignee: Stierlen-Maquet Aktiengesellschaft, Rastatt, Fed. Rep. of Germany

[21] Appl. No.: 764,079

[22] Filed: Jan. 31, 1977

[30] Foreign Application Priority Data

Jan. 31, 1976 [DE] Fed. Rep. of Germany ....... 2603739

[51] Int. Cl.² .......................... B66C 1/62; B66C 1/00
[52] U.S. Cl. ............................ 294/67 DA; 294/815 F
[58] Field of Search ............. 294/67 DA, 67 R, 67 D, 294/81 R, 815 F; 198/682; 105/308 E, 308 P, 308 C

[56] References Cited

U.S. PATENT DOCUMENTS

| 3,458,229 | 7/1969 | Nagy et al. | 294/815 F |
| 3,712,661 | 1/1973 | Strand | 267/67 DA |
| 3,992,050 | 11/1976 | Backteman | 294/67 DA |

Primary Examiner—James B. Marbert
Attorney, Agent, or Firm—Walter Becker

[57] ABSTRACT

A loading and unloading station transporter for conveyors with overhead trolley drives and automatic feeder and withdrawal devices. The transporter is provided with centering means to centrally receive and hold containers for goods to be transported.

4 Claims, 2 Drawing Figures

LOADING AND UNLOADING STATION FOR CONVEYORS WITH OVERHEAD TROLLEY DRIVES

The present invention relates to a loading and unloading station for conveyors with overhead trolley drives comprising automatic feeder and withdrawal devices.

With automatic conveyors having overhead trolley drives, the containers for goods to be transported are automatically fed or placed in and withdrawn from the suspension arrangement of the transporter. Such a device is disclosed, for instance, in German Offenlegungsschrift P 22 59 369. Because the paths or shafts which are used are often very narrow, the containers for goods to be transported must be positioned exactly. At the same time, unduly strong swinging of the containers must be prevented.

It is therefore an object of the present invention to automatically exactly position and fix the container which is intended for goods to be transported and which is supported in the transporter.

This object and other objects and advantages of the present invention will appear more clearly from the following specification in connection with the accompanying drawing, in which.

The transporter suspension arrangement pursuant to the present invention is characterized primarily in that a threaded spindle motor, by means of a corresponding linkage, presses respective centering rollers to the right and left into a centering groove or notch on the container for goods to be transported and simultaneously fixes the container at both sides relative to the transporter suspension arrangement by means of respective bracing roller pairs.

Figure 1:
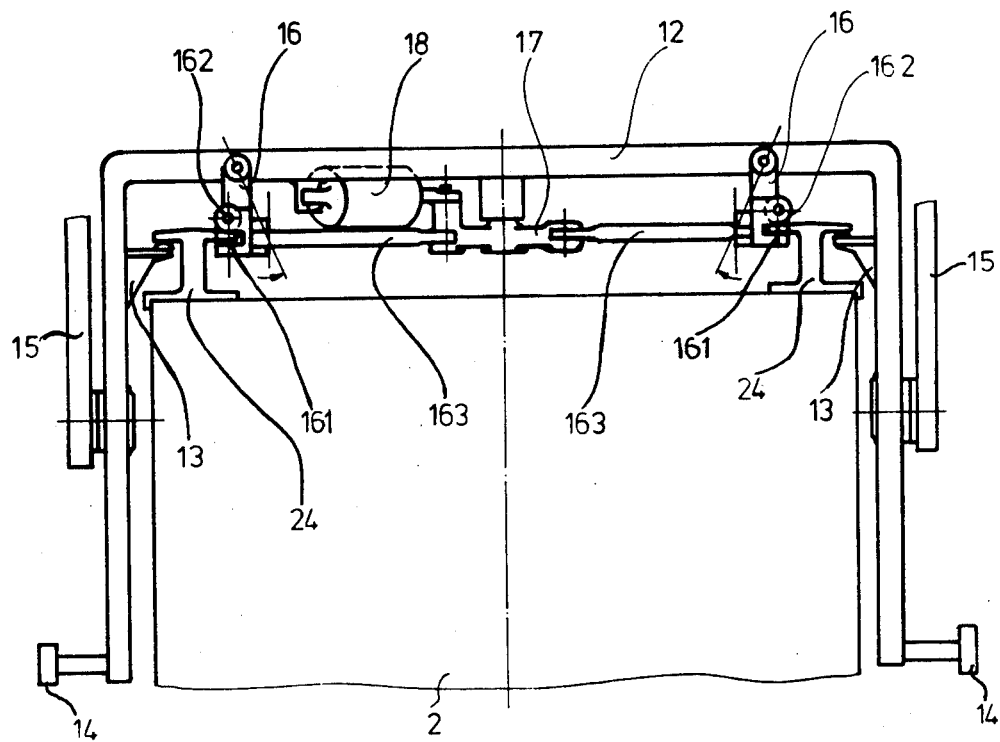
FIG. 1 is a front view of the device of the present invention not showing the transporter per se and only showing the pertinent portion of the container for goods to be transported.
Figure 2:
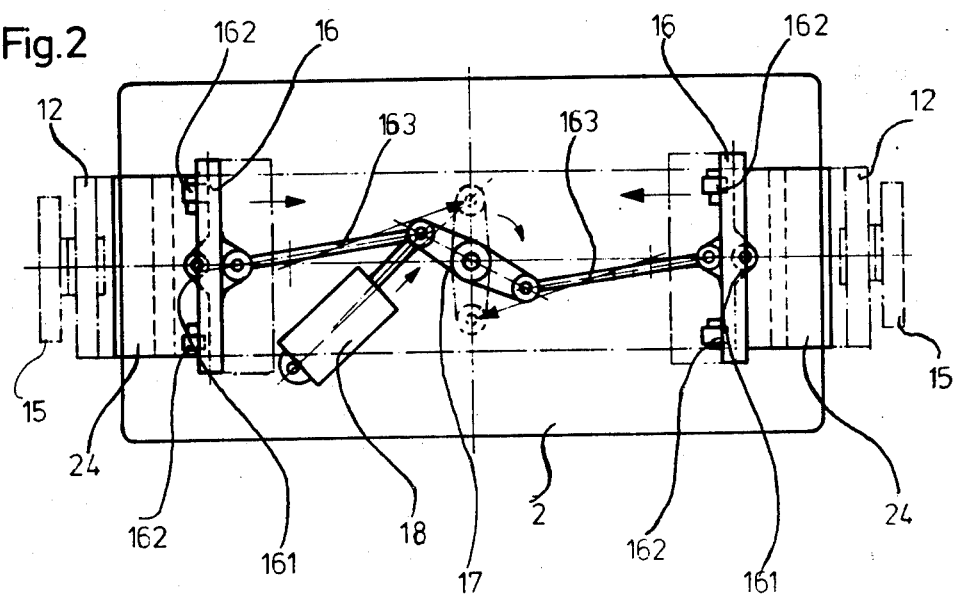
FIG. 2 is a top view of the device of FIG. 1, with the suspension arrangement of the transporter being shown by dot-dash lines.

Referring now to the drawing in detail, after the container 2 for goods to be transported is fed into a transporter (not shown), the container 2, with the aid of an I-shaped grab rail 24 which is mounted on top of the container 2, is received by the supporting noses 13 located on the suspension arrangement 12. At that time, by means of a switching pulse (not further described), the threaded spindle motor 18 is set in operation and turns the positioning lever 17 out of the position shown by dot-dash lines in FIG. 2 into the solid line position. By doing so, with the aid of the connecting rods 163, the positioning arms 16, which are pivotable in the suspension arrangement 12, are pressed outwardly from their inwardly directed starting position. In this connection, the centering rollers 161, which have a vertical axis and are supported on the positioning arms 16, are pressed to the right and left into the centering grooves or notches of the grab rails 24, thereby exactly centering the container 2 relative to the suspension arrangement 12.

At the same time that the positioning arms 16 are pivoted, the supporting rollers 162, which have a horizontal axis and are supported by the positioning arms 16, are pressed upon the top of the grab rails 24, whereby the latter are firmly braced in the suspension arrangement 12 between the supporting noses 13 and the supporting roller pairs 162, and the container 2 cannot swing within the suspension arrangement 12.

The swinging or pivoting of the suspension arrangement 12, which holds the container 2, relative to the transporting arms 15, which swinging is necessary for the transition from horizontal to vertical driving paths and vice versa, is controlled by the guide rollers 14, which run in guide rails (not shown).

It is, of course, to be understood that the present invention is by no means limited to the specific showing in the drawing, but also encompasses any modifications within the scope of the appended claims.

What we claim is:

1. A loading and unloading station transporter for conveyors with overhead trolley drives and automatic feeder and withdrawal devices for transporting containers for goods to be transported, which includes:
   a suspension arrangement for receiving one of said containers; and
   centering means pivotally and rotatably connected to said suspension arrangement for centering and fixing said container in said suspension arrangement, each of said containers having I-shaped flanged grab rails connected thereto for use by said suspension arrangement and said centering means for receiving and fixing said container, said grab rails having notches in their upper inside flanges; and in which said centering means includes:
   positioning arms pivotally connected to said suspension arrangement; and
   centering rollers which have a vertical axis and which are connected to said positioning arms, said centering rollers being operable to engage said notches of said grab rail flanges.

2. A transporter according to claim 1, in which said centering means includes: a threaded spindle motor pivotally connected to said suspension arrangement; and a linkage connected to said motor, said suspension arrangement and said positioning arms and operable to cause said centering rollers to engage the respective notches of said grab rail flanges.

3. A transporter according to claim 1, which includes supporting roller pairs which have a horizontal axis and which are connected to said positioning arms, said roller pairs being operable to rest upon the respective top flanges of said grab rails.

4. A transporter according to claim 2, which includes supporting roller pairs which have a horizontal axis and which are connected to said positioning arms, said roller pairs being operable by said linkage to rest upon the respective top flanges of said grab rails.

* * * * *